United States Patent [19]

Wright et al.

[11] Patent Number: 4,855,660
[45] Date of Patent: Aug. 8, 1989

[54] MICROSTEPPING OF AN UNIPOLAR STEPPING MOTOR

[75] Inventors: Danny O. Wright, Newport News; Kregg S. Wiggins, Tabb, both of Va.

[73] Assignee: Siemens-Bendix Automotive Electronics L.P., Troy, Mich.

[21] Appl. No.: 158,015

[22] Filed: Feb. 18, 1988

[51] Int. Cl.[4] ............................................. H02P 8/00
[52] U.S. Cl. .................................. 318/696; 318/685; 360/78.13
[58] Field of Search ................... 318/696, 685; 360/78

[56] References Cited

U.S. PATENT DOCUMENTS

| 4,518,907 | 5/1985 | Giguere | 318/69 G |
| 4,731,680 | 3/1988 | Moriyama et al. | 360/78 |
| 4,734,847 | 3/1988 | Hunter | 364/174 |

Primary Examiner—William M. Shoop, Jr.
Assistant Examiner—Saul M. Bergmann
Attorney, Agent, or Firm—Russel C. Wells; George L. Boller

[57] ABSTRACT

High resolution microstepping of an unipolar stepping motor is accomplished by applying from a look-up table the values of the SINE and COSINE of a given angle to the control circuit of a unipolar stepping motor. The difference between the present position and the desired position is calculated and depending upon the magnitude of the difference, the degree of microstepping is determined from four steps per ninety electrical degrees of motor rotation to thirty-two steps. By such selection, the positioning of the output shaft of the motor is smoothly and accurately accomplished.

5 Claims, 6 Drawing Sheets

MICROSTEPPING OF AN UNIPOLAR STEPPING MOTOR

This invention relates to control of stepping motors and more particularly to microstepping control of unipolar stepping motors.

BACKGROUND OF INVENTION

Control of stepping motors has involved various design configurations of the motor windings; extensive switching circuits; and the use of sophisticated circuit control elements. As the applications of stepper motors increases, the need for higher stepping resolution also increases.

One method to achieve a higher stepping resolution is by the use of a mechanical gear reduction unit between the motor and the output device. The motor itself is stepped in large angular increments and the output of the motor is applied to a gear reduction unit that converts the large angular motor rotations into smaller angular rotations of the output device. The potential disadvantage in this type of reduction is that the gears may jam, break or malfunction and the control is then lost or compromised.

SUMMARY OF THE INVENTION

It is a principal advantage of the preferred embodiment of the microstepping of an unipolar stepping motor to increase the resolution of the output of the motor.

It is yet a further advantage of the preferred embodiment to utilize an unipolar stepping motor having bifilar windings.

Another advantage of the preferred embodiment is to control the acceleration and deceleration of the stepper motor preventing motor overshoot at the desired position of the motor.

A method for controlling a unipolar stepping motor having a two phase winding and an output shaft connected to a driven member operable to be rotated to a desired position comprises the steps of coupling a first position sensor to the driven member for generating a signal indicating its present position. A second signal is generated representing the desired position of the driven member.

The difference between the desired position and the present position of the driven member is calculated. The magnitude of this difference generates a stepping rate for the motor. A look-up table contains a plurality of values which respond to the size of the electrical step of the motor. The values generate a signal indicating the angular rotation of the motor and then supply power to each winding of the motor for rotating the driven member to the desired position.

Many other objects and purposes of the invention will be clear from the following detailed description of the drawings.

DETAILED DESCRIPTION

In many control applications employing stepper motors it is desireable to increase the resolution of the positioning of the motor armature or output shaft. To increase the resolution, the step size is decreased. To decrease the step size electronically, a technique known as microstepping is used; to decrease the step size mechanically, a gear reduction unit is used between the motor output shaft and the device being positioned.

Figure 1:
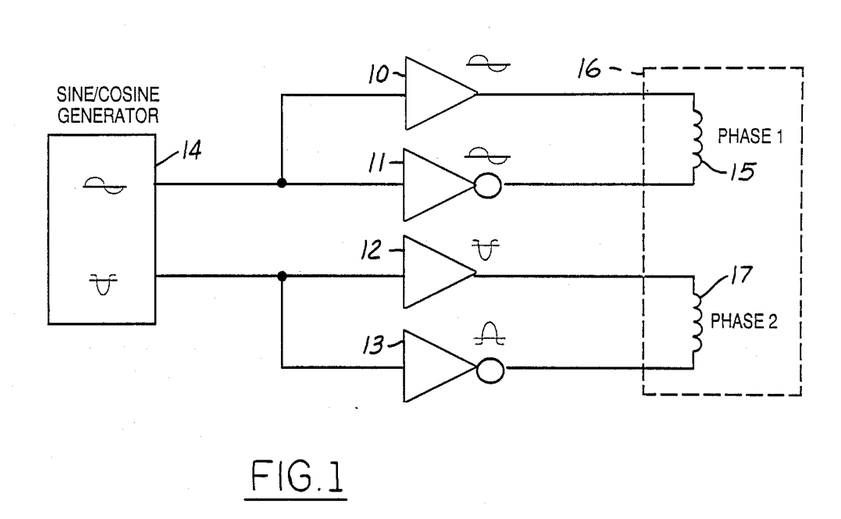
FIG. 1 is a schematic of a classic implementation of microstepping using complementary linear current drivers.

FIG. 1 illustrates a classical implementation of a microstepping control. Each phase, phase one and phase two, of the motor windings is driven by current sources 10–13 having a SINE/COSINE relationship. The resultant magnetic field produces a rotating vector having an amplitude controlling the motor torque. The angular positioning of the vector controls the motor 16 position. This is expressed mathematically as the resultant motor current:

$$I_{torque} = [(I_{p1}^2) + (I_{p2}^2)]^{\frac{1}{2}}$$

where $I_{p1}$, $I_{p2}$ are the currents in each phase winding. By definition:

$$I_{p1} = A \cos(wt)$$

and $$I_{p2} = A \sin(wt)$$ where w is the frequency of the rotating vector in radians per second.

Substituting in the above equation for $I_{torque}$ $$I_{torque} = [(A \cos(wt))^2 + (A \sin(wt))^2]^{1/2}$$

$$I_{torque} = A.$$

Therefore, by controlling peak phase current, A, the motor torque can be controlled. By controlling the the angular rotation of the vector, the angular rotation of the motor can be controlled.

Figure 2:
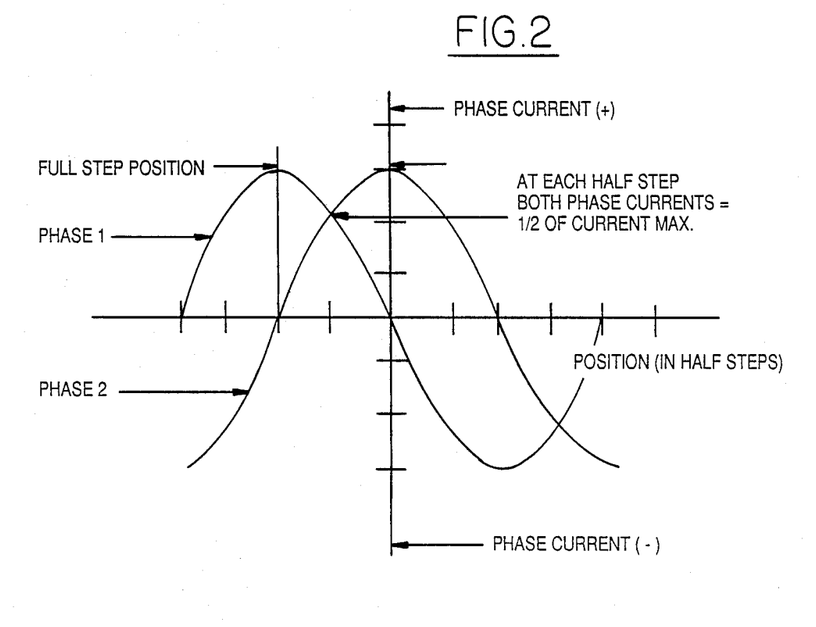
FIG. 2 illustrates waveforms of the SINE and COSINE generator of FIG. 1.

In FIG. 1 illustrates the use of a SINE/COSINE generator 14 connected to two pairs of control amplifiers 10–13. Each amplifier is respectively connected to each end of the phase windings 15, 17 of a bipolar motor 16. In particular, each output of the SINE/COSINE generator is supplied to a complementary amplifier 10–13 or control bridge. FIG. 2 illustrates the SINE and COSINE waveforms superimposed on a grid wherein the x-axis represents positioning in half motor steps and the y-axis represents positive and negative phase current amplitude. Note that for a full mechanical step of the motor 16, the SINE or COSINE waveform moves through ninety electrical degrees.

Figure 3A:
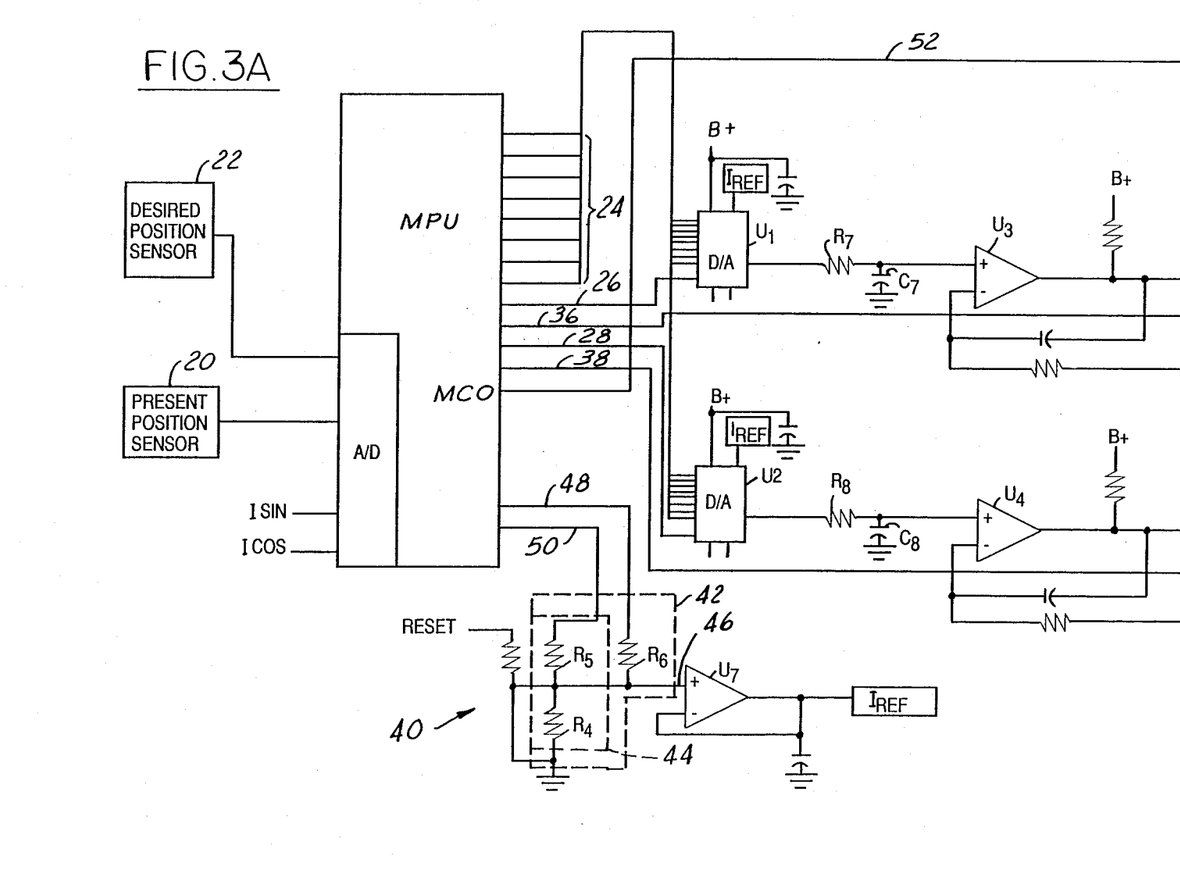
FIGS. 3A and 3B is a schematic of the four phase microstep control circuit of the preferred embodiment.
Figure 3B:
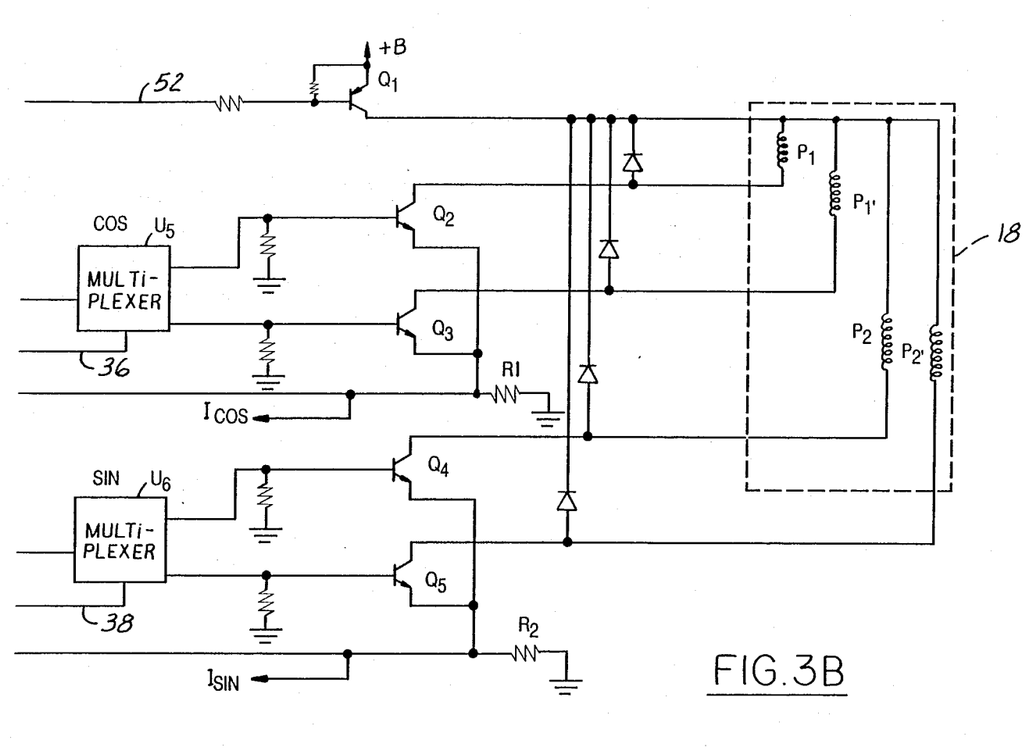

FIGS. 3A and 3B are a schematic block diagram of a control system according to the preferred embodiment. The system has a microprocessor or MPU, a pair of D/A converters U1, U2, a pair of amplifiers U3 and U4, a pair of digital multiplexers U5 and U6, four power transistors Q2, Q3, Q4 and Q5, a winding power transistor Q1 and a current generating torque control system 40 comprising a voltage divider R4, R5 and R6 and an operational amplifier U7 and an unipolar stepping motor 18, represented by windings $p_1$, $p'_1$, $p_2$ and $p'_2$.

The MPU receives various signals from several sensors which generate electrical signals representing various control parameters. For our purposes, only a present position sensor 20 and a desired position sensor 22 are shown. As illustrated, in response to the electricals signals from the two sensors 20, 22, the MPU generates from a look-up table in the MPU an output data word 24 of at least eight bit positions which is supplied to the pair of D/A converters U1 and U2.

The look-up table in the MPU has sixty-four data words which digitally approximate the SINE and COSINE functions of each angular microstep. In the present embodiment the resolution is thirty-two microsteps per full motor step.

In a sixty-four word SINE look-up table representing 180°, the corresponding value for the COSINE of each microstep is positioned ninety-six words away. The look-up table wraps around from the sixty-fourth word to the first word. The wrap around is used to determine a polarity change. Thus, if the SINE word is in position zero, the COSINE word is in position thirty-two which is found as follows:

$$0 + 96 - 64 = 32$$

with the opposite polarity of the SINE word since there is one wrap around. As a general rule, the difference in word positions of a SINE word and COSINE word is equal to 150% of the total number of words. Thus, if sixty-four words are used to represent 180°, the positioning of the corresponding COSINE word is 270° or $(64) \times (150\%) = 96$ words away. In general, wherein the table look-up means is a table of N SINE words representing 180° of motor rotation, the corresponding COSINE word for a given angular rotation is 1.5N words away and each wrap around from the Nth word to the zero word changes the polarity of the word found in the look-up table.

In the preferred embodiment, the MPU is a Motorola MC68HC11A8 device. The look-up table is preloaded in the ROM of the MPU with the necessary sixty-four digital words to accomplish stepping of the motor 18 in thirty-two microsteps per motor step. Using a dual bifilar winding unipolar stepping motor 18 with 50 pairs of poles on its rotor, each motor step is:

$$90°/50 = 1.8°.$$

With a 32 microstep resolution, each microstep of rotation is:

$$1.8°/32 = 0.056°.$$

Figure 5:
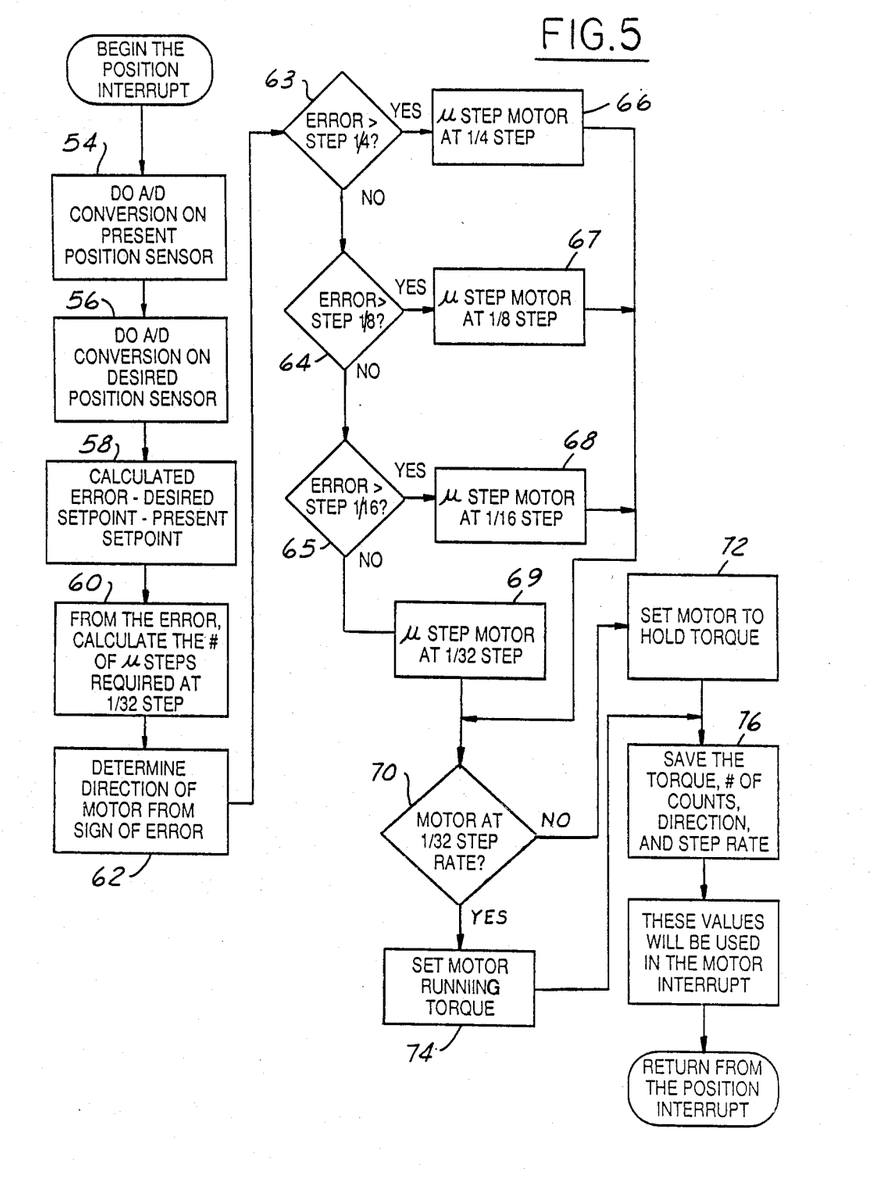
FIG. 5 is a flow chart of the position control.

As will be shown with reference to the method of FIG. 5, the motor 18 can be stepped in either four, eight, sixteen or thirty-two microsteps per motor step. At four microsteps per motor step, each microstep of the motor 18 is:

$$4(1.8°/32) = 0.224°.$$

As the number of microsteps per motor step increases, the resolution of the angular positioning of the motor 18 is increased.

The output data word 24 is supplied to each D/A converter U1, U2 under control of an output 26–28 from the MPU which selects either the SINE or CO- SINE word of the desired step and selects the respective D/A converter. Since there is only one data bus, the MPU controls the selection of operation of each D/A converter U1, U2 by means of a control signal supplied to the latching input of the respective D/A converter.

Figure 4A:
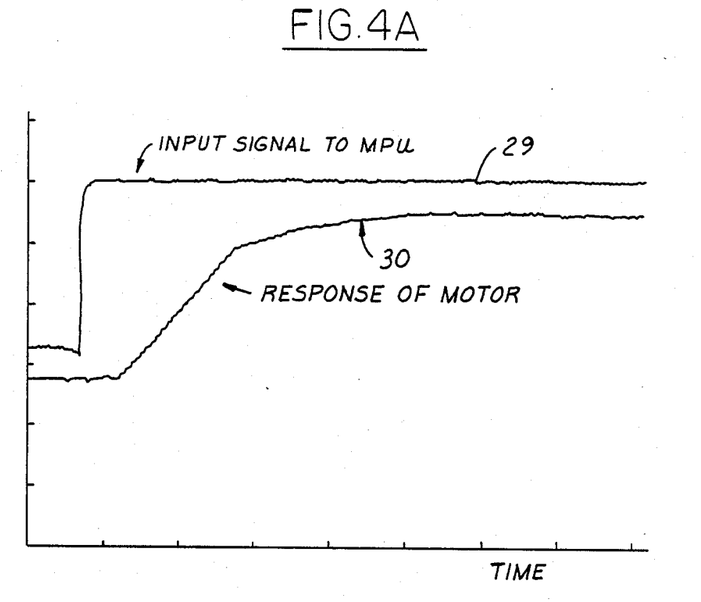
FIG. 4A is a waveform of the control signal input and the step response of the motor.
Figure 4B:
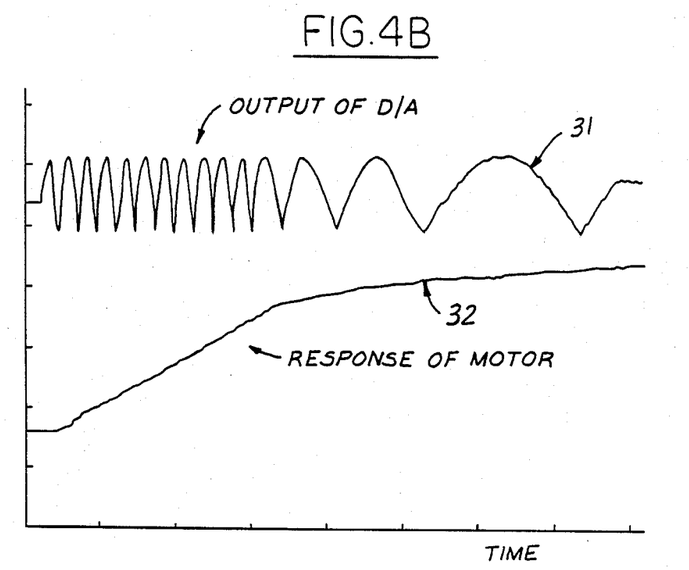
FIG. 4B is a waveform showing the change in the microstepping rate and the step response of the motor.

The output of the D/A's U1 and U2 is supplied as a staircase shaped signal having either four, eight, sixteen or thirty-two steps per ninety electrical degrees to the amplifiers U3 and U4 respectively. The two filters R7, C7, and R8, C8 connected between the output of the D/A's and the input to the amplifiers operate to shape the current signal. In FIG. 4A the upper signal 29 represents the input signal to the MPU and the lower signal 30, 32 in both FIGS. 4A and 4B, represents the rotation of the motor armature shaft as it approaches its desired position. In FIG. 4B, the output of the D/A's is shown as the upper signal 31 which shows the change in microstep stepsize as the error is reduced. It is a principal object of the system to have the motor armature shaft approach but not overshoot the desired position.

In FIG. 4B, the rectified sinusoidal waveshapes 31 represents, as one moves along the x-axis, four, eight, sixteen and thirty-two microsteps per motor step. Referring to FIG. 4B, if there are four microsteps per motor step, the sinusoidal waveshape for ninety electrical degrees is, in FIG. 4B, a staircase of four microsteps spaced at the frequency rate determined by the MPU. Similarly, if there are thirty-two microsteps per motor step, there is a thirty-two step staircase for each ninety electrical degrees of the sinusoid. Since the frequency rate for each microstep is the same, the time to move ninety electrical degrees along the thirty-two step staircase is eight times longer than the time to move ninety electrical degrees along the four step staircase.

The output of the D/A converters U1, U2 is respectively supplied to the noninverting inputs of the amplifiers U3, U4 either directly or through a filter means R7, C7, and R8, C8. Connected to the inverting inputs of the amplifiers is a feedback signal, $I_{cos}$ or $I_{sin}$, developed across a sensing resistor R1, R2 in the winding leads of the motor 18. In addition, the feedback signal, $I_{cos}$ and $I_{sin}$ is supplied to the MPU for proper circuit fault detection. The feedback conversion is compared to the SINE/COSINE numbers output by the MPU.

The output of the amplifiers U3, U4 is supplied to its respective multiplexer U5, U6 which is controlled from the MPU by outputs 36, 38 respectively, for selecting which winding of each phase pair is to be energized. This is accomplished by the energizing of one of the respective power transistors Q2, Q3, Q4, Q5 electrically connected to one end of each winding $p_1$, $p'_1$, $p_2$, $p'_2$. In this manner, current is driven through the windings in the same direction and not the dual directions required by a bipolar motor 16 as illustrated in FIG. 1. In order to rotate the motor armature, one winding of each phase must be energized.

To control the torque output of the motor armature shaft and hence the smooth control of the position of the motor 18, the amount of current supplied to each D/A converter U1, U2 is controlled from the microprocessor MPU through a current generating torque control system 40. The current generating or torque control system 40 comprises a number of voltage divider circuits equal in number to the number of torque control steps.

In the preferred embodiment, there are two voltage divider circuits, the running torque control 42 and the holding torque control 44. The running torque control 42 uses a voltage divider circuit comprising three resistances R4, R5, R6 while the holding torque control 44 uses a voltage divider circuit comprising two resistors R4, R5. The output of the voltage divider circuits 42, 44 is connected to the noninverting input 46 of an operational amplifier U7. The torque control is selected as a combination of two output signals 48, 50 from the MPU. Thus, depending upon the amount of microstepping, the current supplied to the amplifiers U3, U4 from the D/A converters U1, U2 is proportional to the size of the step. In a four microstep per motor step, the largest amount of current representing running torque is supplied while in the thirty-two microsteps per motor step application, the lowest amount of current representing holding torque is supplied. Of course, once the motor 18 is in position, it is held there by the holding torque current.

Still another feature of the microstepping control system is the control by the MPU of the current to the motor windings. If the MPU determines that the motor 18, should not be supplied with power to the windings, a signal MCO 52 is applied to a power switch $Q_1$ to interrupt the application of voltage to the windings $p_1$, $p'_1$, $p_2$, $p'_2$.

A flowchart for the method of Position Interrupt is illustrated in FIG. 5. Typically this is provided in software in the MPU. The function of Position Interrupt is to determine the desired position of the motor, the present position of the motor and the difference or error between the two. From this information, the angular amount and direction of rotation of the motor shaft is determined.

The first step 54 in the method measures the present or actual position of the motor shaft. This may be accomplished by means of a position sensor 20 attached to the motor armature shaft. The position is represented by a number which is a function of the angular position of the motor armature shaft. In the preferred embodiment, the position sensor 20 is an analog device and the voltage signal received therefrom is converted into a digital signal by means of an A/D converter located in the MPU and stored therein.

In a similar manner, in the next step 56, the desired position is determined. If the desired position is determined by the rotation of a lever across a variable resistor, the positioning of the lever may be indicated in a manner similar to the present position. This being so, the desired position signal is supplied to the A/D converter and the resulting digital signal is stored in the MPU.

In order to generate the desired resolution in a thirty-two step motor control, the digital word may have more than eight bits for high resolution. However such a system is more expensive so the variable bit resolution A/D converter of a copending patent application entitled "Method and Control System for Generating a Variable Output Bit Resolution from an N Bit Analog to Digital Converter" filed by the same inventive entity is incorporated herein by reference. As a result, both the desired position and the present position may be determined with a very high resolution utilizing a ten bit word. By using the ten bit word, the very small angular rotations of the motor armature shaft will be accurately made.

In the MPU, an error or difference signal equal to the difference between the desired position and the present position is calculated in the next step 58. From the value of the error signal, the number of microsteps required to rotate the motor armature shaft is determined in step 60 at the rate of thirty-two microsteps per motor step. The sign of the error in the next step 62, indicates the direction of rotation of the motor armature shaft.

The number of microsteps required to rotate the motor shaft is compared with several different values, in the preferred embodiment this is three values, in steps 63–65, to determine the degree of resolution, hence the speed of rotation of the motor armature shaft. In the preferred embodiment, if the angular distance is great, the look-up table will be indexed every 8th word which gives only four microsteps per motor step as stated in step 66.

Since each microstep is a function of the MPU clock rate, it will be only four motor interrupts to rotate the armature shaft one motor step. In the preferred embodiment, this is 1.8° of mechanical rotation. However if the difference number is small, indicating that error number is small, the program will address each of the words in the look-up table and it will be thirty-two motor interrupts to rotate the armature one motor step.

Once the rate of motor stepping is determined in steps 66–69, the program or method checks in step 70 to see if the maximum resolution rate is being used, which is thirty-two, and if it is the torque control in step 72 is adjusted to provide a small torque signal to the two D/A converters U1, U2. In this manner when the error signal is small, the torque is folded back (reduced) to reduce self-heating of the motor 18 and thereby enhance its reliability.

If the rate of motor stepping is other than the maximum resolution rate, the torque control system applies a running torque signal, step 74, to the two D/A converters U1, U2. The next step 76 causes all of the torque values, the error value, direction of rotation and the step rate to be saved for use by the motor interrupt of FIG. 6.

In addition, FIG. 4B illustrates the current in one winding of one phase of the motor as the present position of the motor shaft approaches the desired position. The apparent high frequency signal indicates that the rate of microsteps per motor step is small which in the preferred embodiment is four.

As the present position approaches the desired position, the rate of microstepping per motor step increases to eight, sixteen and finally thirty-two. This is illustrated by the relative change in frequency of the current signal. When the desired position and the actual position are equal, the motor rotation is stopped and the current signal indicates a hold current level. As previously indicated, the torque control system 40 reduces the current in the windings, hence the torque of the motor 18, when the maximum resolution is desired. This prevents overshooting of the desired position by the motor armature shaft and provides a smooth positioning of the motor armature shaft into the desired position.

Figure 6:
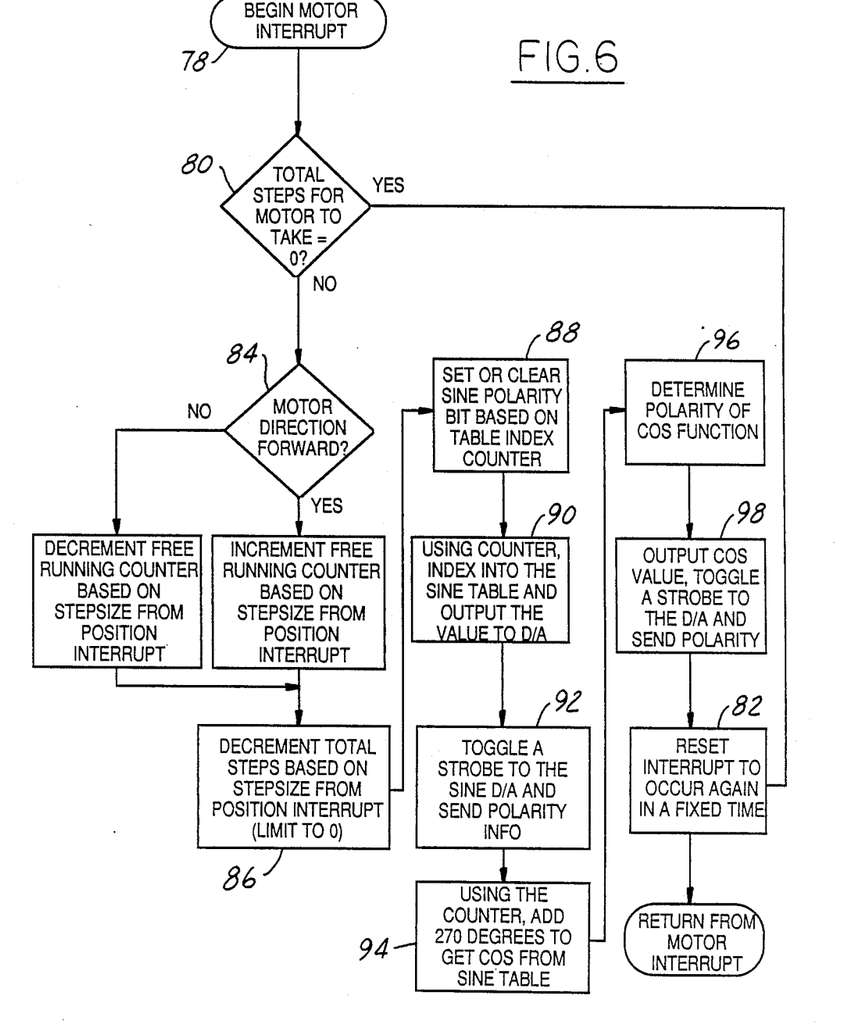
FIG. 6 is a flow chart of the motor control.

Referring to FIG. 6 there is illustrated a flowchart for the method of controlling the operation of the motor according to the preferred embodiment. Typically this is provided in software in the MPU. The MPU program is interrupted with a Motor Interrupt signal step 78 which first checks in step 80 to see if the motor armature shaft is to rotate through any steps. If the answer is NO then the method skips to a reset operation step 80 wherein the Motor Interrupt is reset until a predetermined future time period.

However if the answer is YES, the method next in step 84 indicates that the direction of rotation is to be determined in order to increment the position counter or to decrement the position counter. As previously indicated, the preferred embodiment uses a dual bifilar winding unipolar stepping motor 18 with 50 pairs of poles on its rotor which gives 1.8° per each motor step. Each mechanical step is broken down into thirty-two electrical steps. Since the motor will step through approximately 90 mechanical degrees, there are a total of:

(90°/1.8°)32=1600 electrical steps. The desired position and the present position are measured and stored in counters in terms of electrical steps in steps 56, 58. The next step 86 is to decrement the difference counter according to the size of the electrical step as determined in steps 66–69. If the control is stepping through a large mechanical angle, there are four microsteps per motor step and each microstep is equal to eight counter positions. In a similar manner if there are sixteen microsteps per motor step, indicating that the desired and present position are very close, each microstep is equal to two counter positions.

Since the method works with SINE and COSINE functions, the next step 88 is to set or clear the SINE polarity bit in the microprocessor according to the table index counter. The table index counter indicates the number of microsteps per motor step. This has a value of four, eight, sixteen or thirty-two in the preferred embodiment. The polarity bit indicates whether the SINE is positive or negative. With the value of the index counter, the look-up table is addressed in step 90 to get the digital word representing the SINE of the angle on the sinusoidal curve of the microstep.

The digital word is processed to the D/A converter and the method indicates in step 92 that the SINE polarity is toggled. Since the Sin(C°) equals the Cos(270°+C°), the address of the table is shifted in step 94 by a predetermined count and the value in that word position is equal to the COSINE value of the angle (C°). The polarity of the COSINE function is determined in step 96 and the COSINE polarity is set to the COS D/A converter and the polarity bit is toggled in step 98. The interrupt is reset in step 82 to occur again in a fixed time.

One use of the microstepping of an unipolar d.c. motor 18 is in the electronic throttle systems of a motor vehicle internal combustion engine. The motor armature shaft is directly connected to the throttle valve shaft and positions the throttle valve in response to the accelerator position determined by the vehicle operator. The absence of a mechanical gear reduction unit between the end of the motor 18 and the throttle shaft is a big advantage to this system. The function of the mechanical gear reduction unit is preformed by the microstepping control system described herein.

There has thus been described a system for microstepping of a unipolar stepping motor wherein the torque control of the stepper motor armature or motor shaft is controlled as the rate of motor movement is increased. The system provides for changing the rate of stepping of the motor shaft to control the acceleration and deceleration of the motor shaft during its rotation thereby increasing the resolution. Finally, the use of a unipolar stepping motor having two bifilar windings which are mechanically positioned at 90° to each other results in a simiplified control system in that the current through each winding is controlled by a pulse width amplifier and is always in the same direction. This is in contrast to a bipolar motor wherein the current through the windings is constantly switched to flow in both directions under the control of bidirectional complimentary amplifiers.

Many changes and modifications in the above described embodiment of the invention can, of course, be carried out without departing from the scope thereof. Accordingly, that scope is intended to be limited only by the scope of the appended claims.

We claim:

1. A method for controlling a unipolar stepping motor having a two phase winding and an output shaft connected to a driven member operable to be rotated to a desired position comprising the steps of:
   coupling a first position sensor means to the driven member for generating a signal indicating the present position of the driven member;
   generating a signal representing the desired position of the driven member;
   calculating the difference between the desired position and the present position of the driven member;
   responding to the magnitude of the difference for generating a stepping rate of the motor;
   looking-up in a table in response to a stepping rate of the motor for a signal indicating an angular rotation of the motor; and then
   responding to said signal from the table look-up for supplying power to each winding of the motor for rotating the driven member to the desired position; and wherein the step of looking-up, the table is N words of SINE values for indicating the angular rotation of the motor.

2. A method for controlling a unipolar stepping motor according to claim 1 wherein the step of looking-up, the table is N words of SINE values for indicating the angular rotation of the motor and the COSINE value for the angular rotation is 1.5N words away and the polarity is changed each time the table overflows from the Nth word to the zero word.

3. A system for controlling a unipolar stepping motor comprising:
   a unipolar stepping motor having a two phase winding and an output shaft connected to a driven member, said driven member operable to be rotated to a desired position;
   first position sensor means coupled to said driven member and operable to generate a signal indicating the present position of said driven member;
   desired position signal generator means operable to generate a signal indicating the desired position of said driven member;
   means responsive to each of said position signals for generating an error signal indicative of the difference in said present and desired positions of said driven member;
   means responsive to said error signal for generating a number of steps for said motor;
   table look-up means responsive to said number of steps for generating one of a plurality of signals representing the pulse period for said motor; and
   means responsive to said signal from said table look-up means for supplying power to said motor for rotating said driven member to said desired position; and wherein said table look-up means is a table of N SINE words representing 180° of motor rotation.

4. A system for controlling a stepping motor according to claim 3 wherein said table look-up means is a table of N SINE words representing 180° of motor rotation, the corresponding COSINE word for a given angular rotation is 1.5N words away and each overflow from the Nth word to the zero word changes the polarity of the COSINE word.

5. A unipolar stepping motor control system comprising in combination:

a unipolar stepping motor comprising a two phase winding, each phase winding having two oppositely wound coils, said motor having a shaft that rotates a driven member;

present position sensor means effective to generate a signal indicating the present position of said driven member;

desired position generator means effective to generate a signal indicating the desired position of said driven member;

means responsive to said signals for generating an error signal indicative of the difference between the present position and the desired position of said driven member;

means for generating discrete sine and cosine values of a control current over a range of 360°;

a pair of multiplexers, one for receiving said discrete sine values of said control current, the other for receiving said discrete cosine values of said control current;

for each of said motor coils, a corresponding controlled conduction device for controlling current flow in the corresponding coil, the controlled conduction devices that control the two coils of one phase winding being under the control of one multiplexer and the controlled conduction devices that control the two coils of the other phase winding being under the control of the other multiplexer;

said one multiplexer serving to cause one of the two controlled conduction devices that is under its control to be conductive for only positive sine values of said control current and to cause the other of the two controlled conduction devices that is under its control to be conductive for only negative sine values of said control current; and said other multiplexer serving to cause one of the two controlled conduction devices that is under its control to be conductive for only positive cosine values of said control current and to cause the other of the two controlled conduction devices that is under its control to be conductive for only negative cosine values of said control current.

* * * * *